United States Patent
Mashitani

(10) Patent No.: US 8,638,497 B2
(45) Date of Patent: Jan. 28, 2014

(54) LIGHT SOURCE FOR STEREOSCOPIC DISPLAY

(75) Inventor: Ken Mashitani, Neyagawa (JP)

(73) Assignee: Vision3D Technologies, LLC, Mountain View, CA (US)

(*) Notice: Subject to any disclaimer, the term of this patent is extended or adjusted under 35 U.S.C. 154(b) by 16 days.

(21) Appl. No.: 13/106,592

(22) Filed: May 12, 2011

(65) Prior Publication Data

US 2011/0211255 A1    Sep. 1, 2011

Related U.S. Application Data

(62) Division of application No. 11/730,090, filed on Mar. 29, 2007, now Pat. No. 7,957,060.

(30) Foreign Application Priority Data

Mar. 30, 2006 (JP) ................ 2006-094183

(51) Int. Cl.
G02B 27/22 (2006.01)

(52) U.S. Cl.
USPC .......................... 359/462; 362/97.1

(58) Field of Classification Search
None
See application file for complete search history.

(56) References Cited

U.S. PATENT DOCUMENTS

| | | | |
|---|---|---|---|
| 4,829,365 A | 5/1989 | Eichenlaub | |
| 5,949,390 A | 9/1999 | Nomura et al. | |
| 6,040,807 A * | 3/2000 | Hamagishi et al. | 345/6 |
| 6,094,216 A | 7/2000 | Taniguchi et al. | |
| 6,128,132 A * | 10/2000 | Wieland et al. | 359/463 |
| 2003/0206343 A1* | 11/2003 | Morishima et al. | 359/463 |
| 2005/0088723 A1* | 4/2005 | Kawazoe et al. | 359/333 |
| 2005/0117216 A1 | 6/2005 | Lee | |
| 2006/0152523 A1* | 7/2006 | Tomita | 345/589 |
| 2007/0188711 A1* | 8/2007 | Sharp et al. | 353/8 |

FOREIGN PATENT DOCUMENTS

| | | | |
|---|---|---|---|
| JP | 07-181429 A | 7/1995 | |
| JP | 08-036145 A | 2/1996 | |
| JP | 08-194190 A | 7/1996 | |
| JP | 08-331605 A | 12/1996 | |
| JP | 9-15549 | 1/1997 | |
| JP | 2001-211465 A | 8/2001 | |
| JP | 2003-295115 A | 10/2003 | |
| JP | 2005-078076 A | 3/2005 | |
| JP | 2005-091448 A | 4/2005 | |
| WO | WO 2004046788 A1 * | 6/2004 | G02B 27/22 |

OTHER PUBLICATIONS

Japanese Office Action issued in Japanese Patent Application No. 2007-095627, issued on Jan. 18, 2011.

* cited by examiner

*Primary Examiner* — Stephone B Allen
*Assistant Examiner* — Jyotsna Dabbi
(74) *Attorney, Agent, or Firm* — DC Patent Lawyers, PLLC

(57) ABSTRACT

A light source for a stereoscopic display device that includes a plurality of lights arranged in parallel, each light corresponding to a pair of displays including at least a first display of a first image, and a second display of a second image, wherein the lights form a row in a horizontal direction arranged essentially in the same interval spacing and parallel to each other, with the lights in each row arranged with vertical stacked pitch patterns that differ by at least between the upper and lower positions.

8 Claims, 12 Drawing Sheets

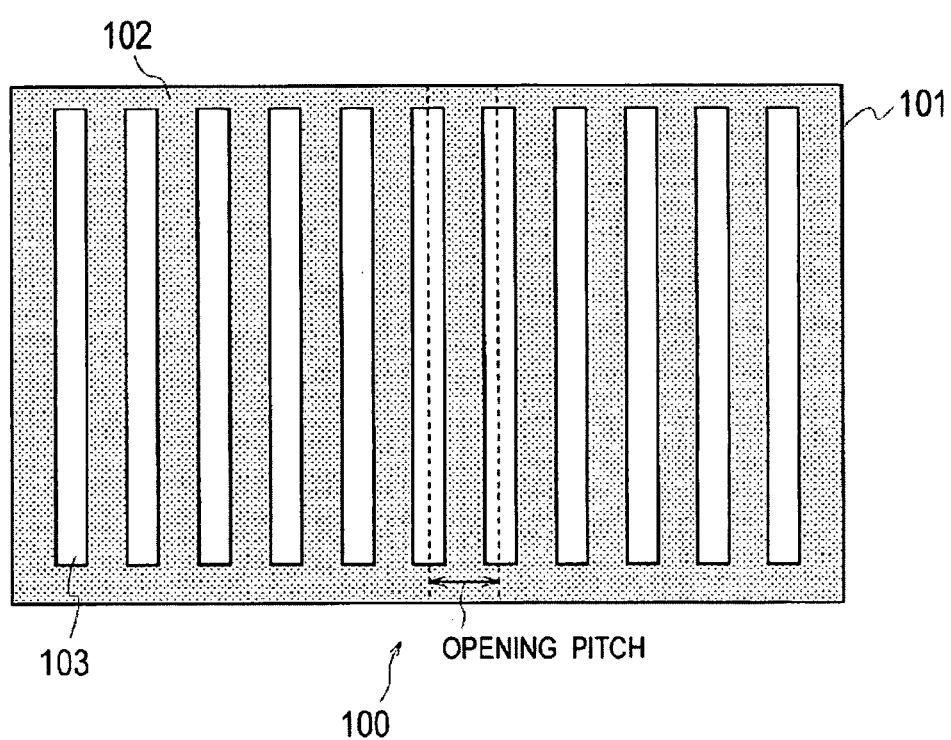

L: LEFT-EYE IMAGE
R: RIGHT-EYE IMAGE
B: BLACK MATRIX

V1: IMAGE FOR VIEWER B
V2: IMAGE FOR VIEWER C
B: BLACK MATRIX 0.099625 0.099625 0.099625 0.099625 0.099625 0.099625 0.099625 0.099625

0.100  0.100  0.099  0.100  0.100  0.099  0.100  0.099

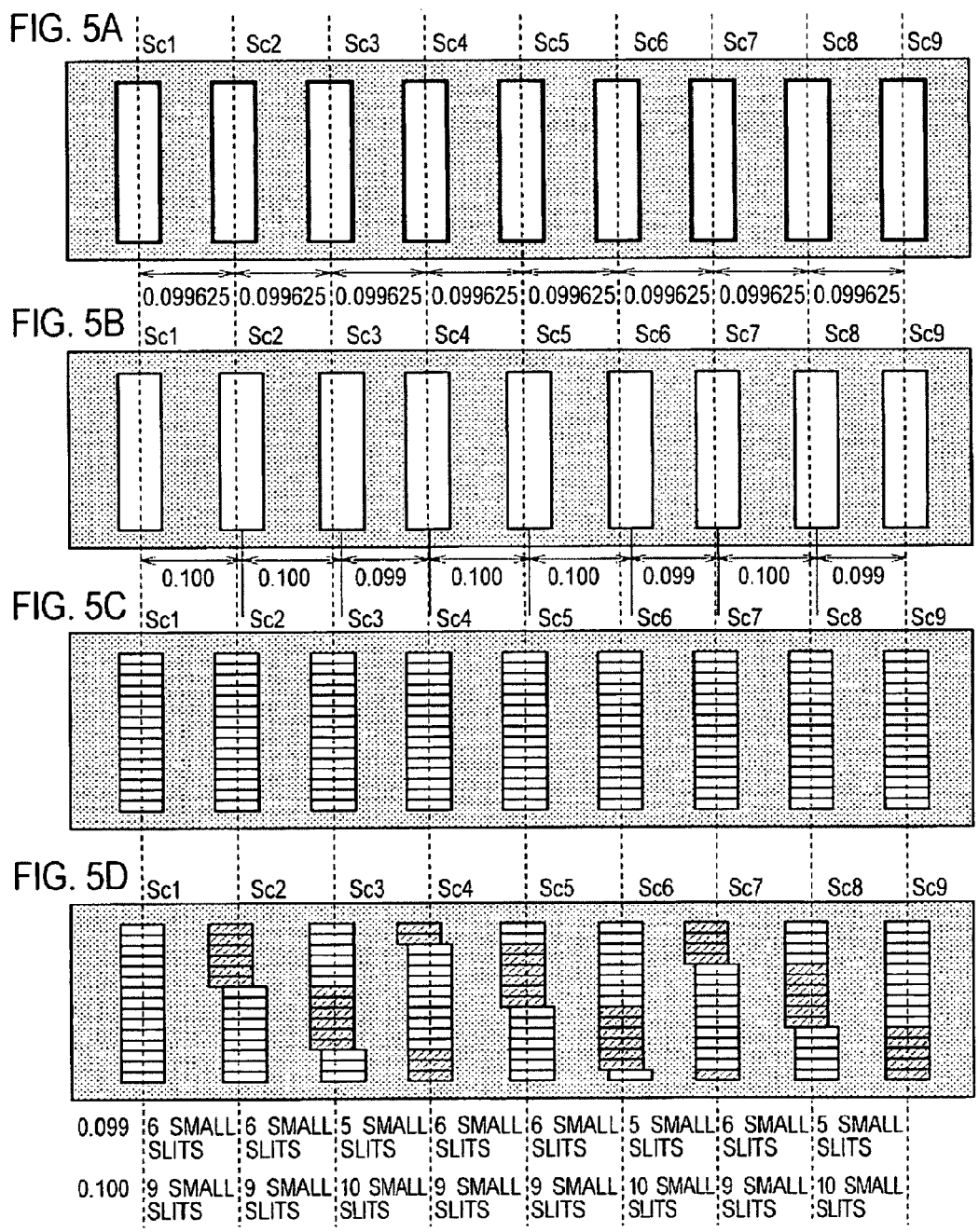

L : LEFT-EYE IMAGE
R : RIGHT-EYE IMAGE

V1 : IMAGE FOR VIEWER B
V2 : IMAGE FOR VIEWER C

LIGHT SOURCE FOR STEREOSCOPIC DISPLAY

CROSS REFERENCE TO RELATED APPLICATIONS

This application is a Divisional of U.S. patent application Ser. No. 11/730,090, filed Mar. 29, 2007, now U.S. Pat. No. 7,957,060 and claims priority based on 35 USC 119 from prior Japanese Patent Application No. P2006-094183 filed on Mar. 30, 2006, the entire contents of each of which are incorporated herein by reference.

BACKGROUND OF THE INVENTION

1. Field of the Invention

The invention relates to an optical filter such as a parallax barrier, which forms light shielding barrier on a transparent substrate, and also relates to a stereoscopic visual display device and to a multiple visual display device, which use the optical filter.

2. Description of Related Art

The technology of optical filtering for example by a parallax barrier that forms a light shield (also referred to here as just "barrier") on a transparent substrate made of transparent glass or transparent resin is known for stereoscopic visual display devices without wearing special glasses. Also known are multiple image display devices that provide different images simultaneously to more than two viewers.

FIG. 1 shows an exemplary parallax barrier. As seen in this figure, parallax barrier 100 comprises an opening (slit) area 103 that lets light penetrate, on glass substrate 101 where barrier 102 is formed, which blocks light penetration.

FIG. 2A is a simple diagram showing the principle of a stereoscopic visual display device that does not require wearing special glasses of two viewpoints with parallax barrier 100. As been here, left-eye image L and right-eye image R are displayed in alternate shifts on liquid crystal display device 104. Black matrix B is positioned between a left-eye image L and a right-eye image R, which partitions the left-eye image L and the right-eye image R. Each interval of the left-eye image L and the right-eye image R is varied in the manufacturing process. The intervals are arranged to specified precise values, called "pixel pitch". FIG. 2A shows a pixel pitch as P.

In FIG. 2A, a left-eye image L and a right-eye image R on liquid crystal display device 104 traverse opening area 103 of parallax barrier 100 as a pair. The left-eye image L and the right-eye image R respectively lead to a viewer A's left and right eyes. As a result, viewer A can achieve stereoscopic vision using binocular parallax.

FIG. 2A also shows a diagram of the stereoscopic visual display device from a top-down perspective. Here, the left-eye image L and the right-eye image R, which are displayed to opening (slit) area 103 and liquid crystal display device 104, are formed in vertical stripes, i.e. in a top-down direction. Additionally, FIG. 2A shows a stereoscopic visual display device from two views, although stereoscopic visual display devices of three or more viewpoints are contemplated.

FIG. 2B is a simple diagram that shows the principle of a device having multiple visual displays, via use of parallax barrier 100. Here, image V1 for viewer B and image V2 for viewer C are displayed in alternate shifts on liquid crystal display 105. A black matrix is positioned between image V1 for viewer B and image V2 for viewer C, thus constituting a partition with image V1 for viewer B and image V2 for viewer C. Although each interval of image V1 for viewer B and image V2 for viewer C is varied in the manufacturing process, the interval may be set to a precise pixel pitch P.

In FIG. 2B, image V1 for viewer B and image V2 for viewer C on liquid crystal display 105 traverse opening area 103 of parallax barrier 100 as a pair. Image V1 for viewer B and image V2 for viewer C respectively lead to viewer B and viewer C. As a result, each of viewers B and C can observe different images.

FIG. 2B also shows a diagram of a multiple visual display device from a top perspective. Here, image V1 for viewer B and image V2 for viewer C, which are displayed through opening (slit) area 103 and liquid crystal display device 105, form in vertical stripes (tap-down direction). In addition, FIG. 2B shows a multiple visual display device that displays two images, although multiple visual display devices that display three or more images are contemplated.

As shown in this figure with parallax barrier 100, the distances between the centerline of each adjoining slit, (opening area pitch, which is described as slit pitch below), are formed to meet certain criteria that allow a viewer A to experience stereoscopic vision without a sense of incongruity as in FIG. 2A. The criteria also provide the condition wherein viewer B and viewer C can observe different images without the sense of incongruity as in FIG. 2B.

Specifically, (see FIG. 2A), determining a distance between a viewer A's eyes as E, a pixel pitch of liquid crystal display device 104 as P, and a split pitch of parallax barrier as S, an ideal slit pitch can be calculated by the following expression (equation 1).

$$S = 2 \times P \times E / (P + E) \quad \text{(equation 1)}$$

Here, 65 mm is generally considered ideal for the distance between human's eyes. For example, assuming slit pitch of liquid crystal display 104 is P=0.11 mm, approximately S=0.219628 mm is obtained from equation 1.

Thus, in order for a viewer to watch a stereoscopic image without a sense of incongruity, it is necessary for a slit to form a parallax barrier so that all slit pitches become S=0.219628 mm.

In addition, as shown in FIG. 2B, it is necessary for a slit to form an arranged parallax barrier so that the slit pitch allows viewers B and C to watch different images without the sense of incongruity. However, it is very difficult presently to form the parallax barrier such that a slit is arranged to satisfy the minute conditions strictly for such a slit pitch. Even in such circumstances when the slit pitch is uneven, a parallax barrier, is needed for a viewer to observe stereoscopic vision without the sense of incongruity, as disclosed to Japanese Laid-Open Patent Publication No. 08-36145.

In addition, Japanese Laid-Open Patent Publication No. 08-36145 discloses barrier pitch (distance between barriers) rather than slit pitch, but because barrier pitch and slit pitch are equivalent, a similar phenomenon applies to slit pitch as well.

In Japanese Laid-Open Patent Publication No. 08-36145, a barrier is arranged so that a plurality of different barrier pitches (distance between barriers) coexist, and the parallax barrier, which arranged a barrier so that the average of the barrier pitch becomes the ideal barrier pitch, is described. According to such a method, even if a plurality of different barrier pitches coexist and are formed, a parallax barrier allows a viewer a stereoscopic vision without the sense of incongruity by providing the ideal barrier pitch.

However, problems exist in the parallax barrier when different slits are mixed and arranged. In particular, unevenness results by the creation of a gap between each slit and arranged slits in their ideal slit pitch (also referred to here as ideal slit).

Such a problem is specifically explained below. FIG. 3A shows parallax barrier 100 having an ideal slit. In FIG. 3A, the ideal slit pitch is assumed to be 0.099625 mm. The numbers of slits are determined as nine for convenience of explanation.

FIG. 3B shows parallax barrier 110 having a slit arranged with two different slit pitches. In FIG. 3B, one split pitch is 0.100 mm, the other slit pitch is 0.099 mm, and another slit has nine parallax barriers. At this time, (0.100 mm×5+0.099 mm×3)/8=0.099625 nm is obtained, which on average becomes the ideal slit pitch. As described above, when a parallax barrier in FIG. 3B is utilized for stereoscopic visual display device in FIG. 2A, a viewer can have stereoscopic vision without the sense of incongruity. When such barrier is utilized in a multiple visual display device as described in FIG. 2B, each of viewers B and C can observe the different images without a sense of incongruity.

When parallax barriers with a greater number of slits are formed, for example, the combination of the arranged nine slits is deemed one unit (a cycle) for the above average of slit pitch to assume ideal slit pitch, and a parallax barrier is formed in an increase of a slit in every unit. In such a parallax barrier (parallax barrier in a cycle pitch type), the average slit pitch becomes ideal.

FIG. 3C is a diagram showing an overlap between parallax barrier 100 and parallax barrier 110. A hatching area in FIG. 3C shows gap areas with slits on parallax barrier 100 having an ideal slit coexisting with slits on parallax barrier 110 having different slit pitch.

In FIG. 3C, this gap occurs only on the right side or the left side. When the magnitude of this gap area is recognized by the human eye, problems occur. For example, when parallax barrier 110 is utilized for stereoscopic visual display device or multiple visual display devices, hue, chroma, and brightness in images that radiate from each slit differ. This causes a perceptional problem of unevenness to the viewer.

SUMMARY OF THE INVENTION

An aspect of the present invention provides an optical filter that includes a plurality of slits arranged in parallel, each slit corresponding to a pair of displays including at least a first display of a first image, and a second display of a second image, wherein the slits form a slit row in a horizontal direction arranged essentially in the same interval spacing and parallel to each other, with the slit row arranged with slit pitch patterns that differ by at least between the upper and lower positions.

Another aspect of the invention provides a multiple visual display device that includes an image display unit having image display regions arranged essentially in the same interval spacing, the image display regions include first region displaying a first image, and a second region displaying a second image, a plurality of slits arranged in parallel, each slit corresponding to a pair of displays including at least the first region and second region, wherein the slits form a slit row in a horizontal direction arranged essentially in the same interval spacing and parallel to each other, with the slit row arranged with slit pitch patterns that differ by at least between the upper and lower positions, wherein the first image is observed at a first observation position though the optical filter, and the second image is observed at a second observation position though the optical filter.

Furthermore, another aspect of the invention provides a stereoscopic visual display device that includes an image display unit having image display regions arranged essentially in the same interval spacing, the image display regions include first region displaying a first view image, and a second region displaying a second view image, a plurality of slits arranged in parallel, each slit corresponding to a pair of displays including at least the first region and second region, wherein the slits form a slit row in a horizontal direction arranged essentially in the same interval spacing and parallel to each other, with the slit row arranged with slit pitch patterns that differ by at least between the upper and lower positions, wherein the slits form a slit row in a horizontal direction arranged in essentially a common interval and parallel to each other, the slit row is arranged with slit pitch patterns that differ by at least between their upper and lower positions, wherein the first view image is observed at a first view position though the optical filter, and the second view image is observed at a second view position though the optical filter.

Furthermore, another aspect of the invention provides a light source unit that includes a plurality of light sources arranged in parallel, each light source corresponding to a pair of displays including at least a first display displaying a first image and a second display displaying a second image, wherein light sources form a light source row in a horizontal direction arranged essentially in a common interval spacing and parallel to each other, and wherein the horizontal deviation of the light source row is at least as much as the deviation of spacing of in divided light sources between their upper and lower positions.

Furthermore, another aspect of the invention provides a stereoscopic visual display device that includes an image display unit having image display regions arranged essentially in the same interval spacing, the image display regions include first region displaying a first view image, and a second region displaying a second view image; a plurality of light sources arranged in parallel, each light source corresponding to a pair of displays including at least a first display displaying a first image and a second display displaying a second image, wherein light sources form a light source row in a horizontal direction arranged essentially in a common interval spacing and parallel to each other, and wherein the horizontal deviation of the light source row is at least as much as the deviation of spacing of in divided light sources between their upper and lower positions, wherein the first view image is observed at a first view position though the optical filter, and the second view image is observed at a second view position though the optical filter.

BRIEF DESCRIPTION OF THE DRAWINGS

FIG. 1 is a diagram that shows an exemplary parallax barrier.

FIGS. 5A through FIG. 5D are diagrams explaining layout methods in a pair of slits of the parallax barrier according to an embodiment.

DETAILED DESCRIPTION OF EMBODIMENTS

An optical filter and an embodiment of a visual display device with the use of the optical filter according to the invention are described with reference to the accompanying drawings. The use of a parallax barrier as an example is explained in this embodiment.

Figure 4:
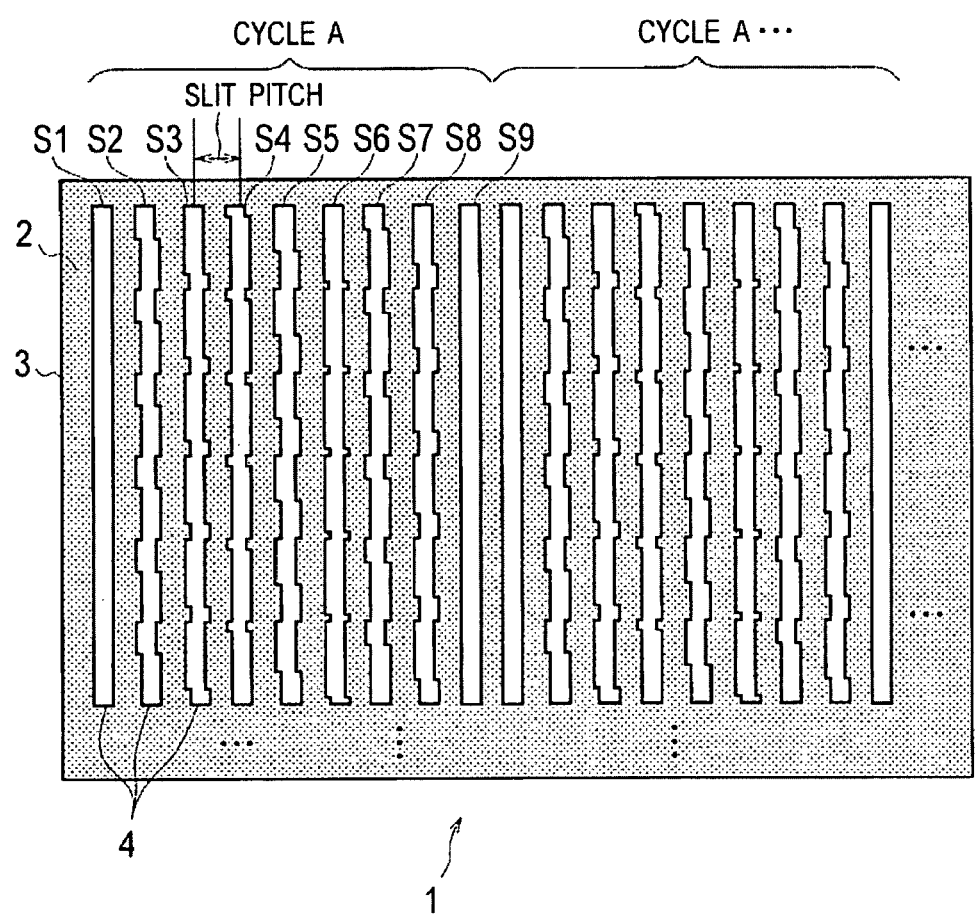
FIG. 4 is a diagram that shows a configuration of a parallax barrier according to an embodiment.

FIG. 4 shows an exemplary configuration of a parallax barrier. Parallax barrier 1 comprises shading barrier 2 and slits 4, which allow light transmission and are placed in specified intervals on transparent substrate 3. Transparent glass and transparent resin are included in transparent substrate 3.

Nine irregular shaped slits S1 to S9 are designated as one unit (also referred to as "cycle A"), and parallax barrier 1 is formed by repeatedly arranging cycle A in a horizontal direction (left and light direction in FIG. 1).

If each of slits S1 to S9 are divided into multiple minute regions, a mixture of two different kinds of slit pitches that have different intervals are found in each of the multiple minute regions. However, the average interval spacings for slits S1 to S9 are determined to form an ideal slit pitch as described above. The slit pitch of the irregular shaped slits S1 to S9 in parallax barrier 1 of FIG. 4 is an interval between straight lines where a center of gravity of slits lying next to each other slip through in a vertical direction (up and down direction in FIG. 4). As a result, parallax barrier 1, configured by repeatedly arranging cycle A, has slits wherein average slit pitch value becomes equal to an ideal slit pitch.

In parallax barrier 1 of FIG. 4, a shape of each slit is formed to create a size of gap region between slits and each corresponding ideal slit of the slits as evenly as possible in the entire parallax barrier 1. In degree of dispersion, the size of the gap region between each slit is at least a size that human eyes cannot recognize from experience, and the image variance occurring from each slit due to differences of the gap region sizes is at least a variance that human eyes cannot recognize from experience. Therefore, a gap of the two kinds of slit pitches above (degree of dispersions) in parallax barrier 1 is notable as around 0.1 to 10 μm, (e.g., between 0.1 to 10 μm). The term "around" as used herein is intended to include values, particularly within 50% of the stated values that yield the stated functional result. This accommodates variance in human perception as well as manufactory tolerances and changes due to temperature.

There is an alternative to apply further multiple different slit pitches to arrange each slit as cycle A configures further multiple slits. A dispersion of the multiple slit pitches may be around 0.1 to 10 μm to prevent human eyes from recognizing a gap region size that occurs due to differences between the slits and ideal slits.

Next, a manufacturing method of such parallax barrier is explained. FIGS. 5A through 5D are diagrams that explain a manufacturing method of slits S1 to S9, which form cycle A in parallax barrier 1. FIG. 5A is a diagram that shows an arrangement of slits Sc1 to Sc9 in ideal slit pitch. In FIGS. 5A through 5D, a vertical length (length) of slits Sc1 to Sc9 is around 0.15 mm and a horizontal length (width) of slits Sc1 to Sc9 is around 0.01 to 0.05 mm. An ideal slit pitch is defined as 0.099625 mm for convenience sake.

On the other hand, FIG. 5B is a diagram that shows an arrangement of slits Sc1 to Sc9 in a mixture of two different kinds of slit pitches. In FIG. 5B, one slit pitch (also referred to here as "first slit pitch") is 0.099 mm and the other slit pitch (also referred to here as "second slit pitch") is 0.100 mm. There are three first slit pitches and five second slit pitches. As a result, an average value of the slit pitches becomes (0.100 mm×5+0.099 mm×3)/8=0.099625 mm, which is equal to ideal slit pitches.

FIG. 5C is a diagram that shows a configuration of small slits such that slits Sc1 to Sc9 of FIG. 5A are equally divided by fifteen. The length of slits Sc1 to Sc9 is around 0.15 mm as described above, and a width of each small slit consequently is around 0.01 mm.

FIG. 5D is a diagram that shows a configuration of slits Sc1 to Sc9. Slit pitches are decided in every middle slit, which is formed by selectively combining multiple small slits of FIG. 5C.

Formation of middle slits and determination of slit pitches are made under the following conditions. According to FIG. 5B, slits Sc1 to Sc9 include three first slit pitches. Accordingly, small slits, which should be arranged with the first slit pitches are 15×3=45. Slits Sc1 to Sc9 also include five second slit pitches, and small slits which should be arranged with the second slit pitches are 15×5=75.

Next, small slits, which should be arranged with the first slit pitches, are dispersed in eight places among the slits. As for dispersion, for example, a middle slit which should be arranged with the first slit pitch is formed with a combination of small slits (6 small slits, 6 small slits, 5 small slits, 6 small slits, 6 small slits, 5 small slits, 6 small slits, 5 small slits).

In the same manner, a middle slit which should be arranged with the second slit pitch is formed in each slit of slits Sc1 to Sc9 with a combination of rest of the small slits (9 small slits, 9 small slits, 10 small slits, 9 small slits, 9 small slits, 10 small slits, 9 small slits, 10 small slits). There is a case where one small slit becomes a middle slit.

For example, as shown in FIG. 5D, a middle slit including six small slits is arranged with the first slit pitch in between Sc1 and Sc2, and a middle slit including the rest of nine small slits is arranged with the second slit pitch.

In FIG. 5D, the interval between the hatched middle slits and corresponding middle slits placed at the left side of the hatched middle slits have a first slit pitch. The rest of middle slits have a second slit pitch.

Figure 6A:
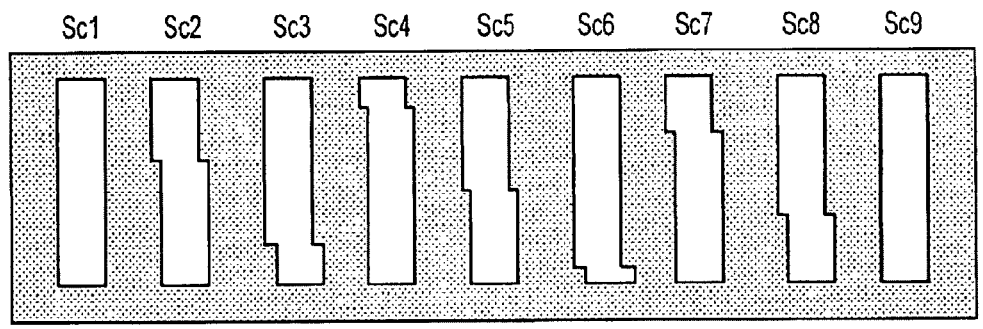
FIGS. 6A through FIG. 6C are diagrams explaining figures of a pair of slits of the parallax barrier according to an embodiment.

Although FIG. 5D displays borders of small slits and middle slits in each slit of slits Sc1 to Sc9 for convenience sake, the borders do not exist in real slits Sc1 to Sc9, and the slits are formed in a way as shown in FIG. 6A.

Figure 6B:
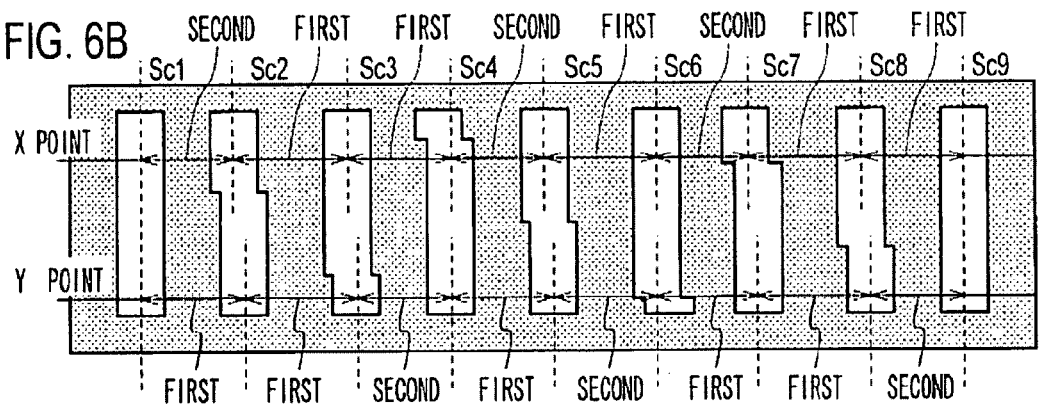

FIG. 6B shows that slits Sc1 to Sc9 have different combinations of slit pitch arrangements of each slit (slit pitch pattern) in two positions which differ from the top and bottom (X point and Y point). In FIG. 6B, "first" represents a first slit pitch and "second" represents a second slit pitch.

Figure 6C:
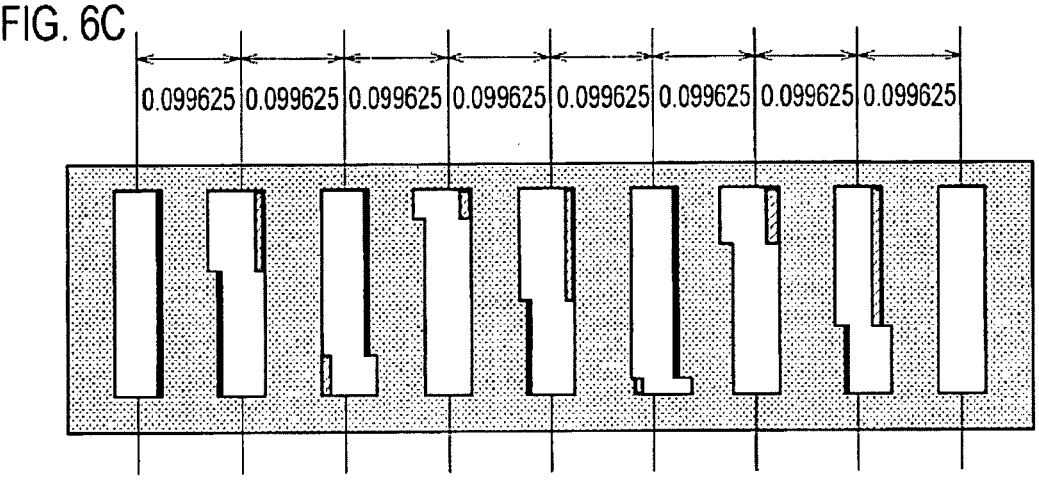

FIG. 6C is a diagram that combines slits Sc1 to Sc9 of FIG. 5D with slits Sc1 to Sc9 of FIG. 5A, which is arranged with an ideal slit pitch. As shown in FIG. 6C, concerning slit Sc2 to Sc8 other than slit Sc1 and Sc9, the gap occurs vis-à-vis the ideal slit Sc2 to Sc8 of FIG. 5A.

However, a slip gaps are dispersed to left and right by forming slits Sc1 to Sc9 as described above. The size of the gap region of each slit is set to a size that human eyes cannot recognize. As a result, a viewer is not aware of uneven images in the gap region of each slit.

Figure 7:
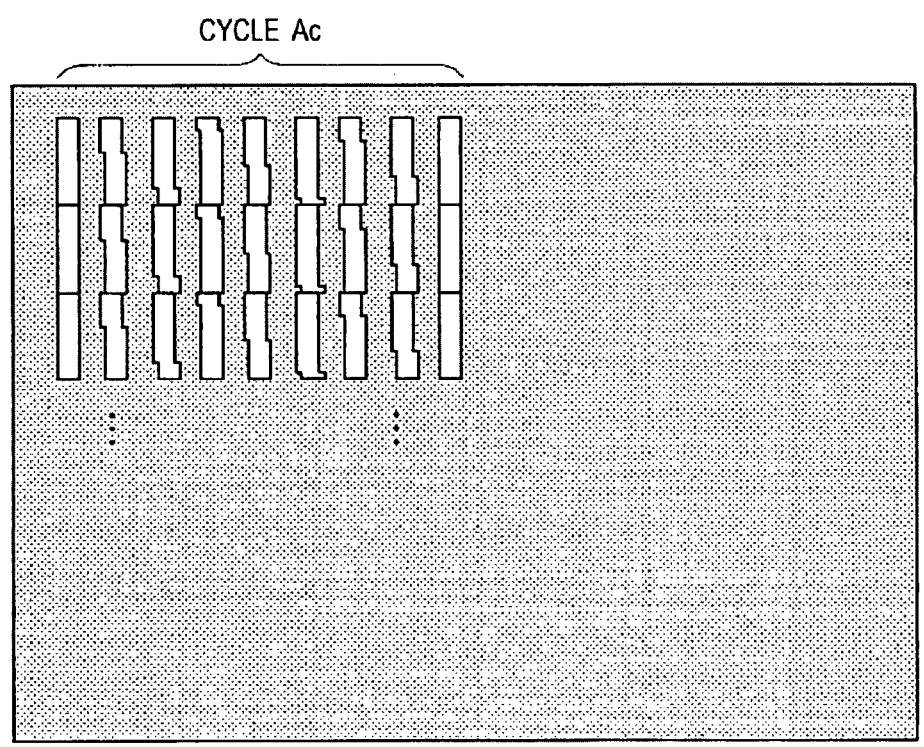
FIG. 7 is a diagram explaining a method of forming a parallax barrier from a pair of slit of the parallax barrier according to an embodiment.

Nine slits of Sc1 to Sc9 are designated as one unit (also referred to here as "cycle Ac") as described above. Cycle A, which designates slit S1 to S9 as one unit is configured by cycle Ac repeatedly arranged in a vertical direction as shown in FIG. 7. Consequently, parallax barrier 1 can be configured by repeating the cycle A in a horizontal direction.

Figure 8:
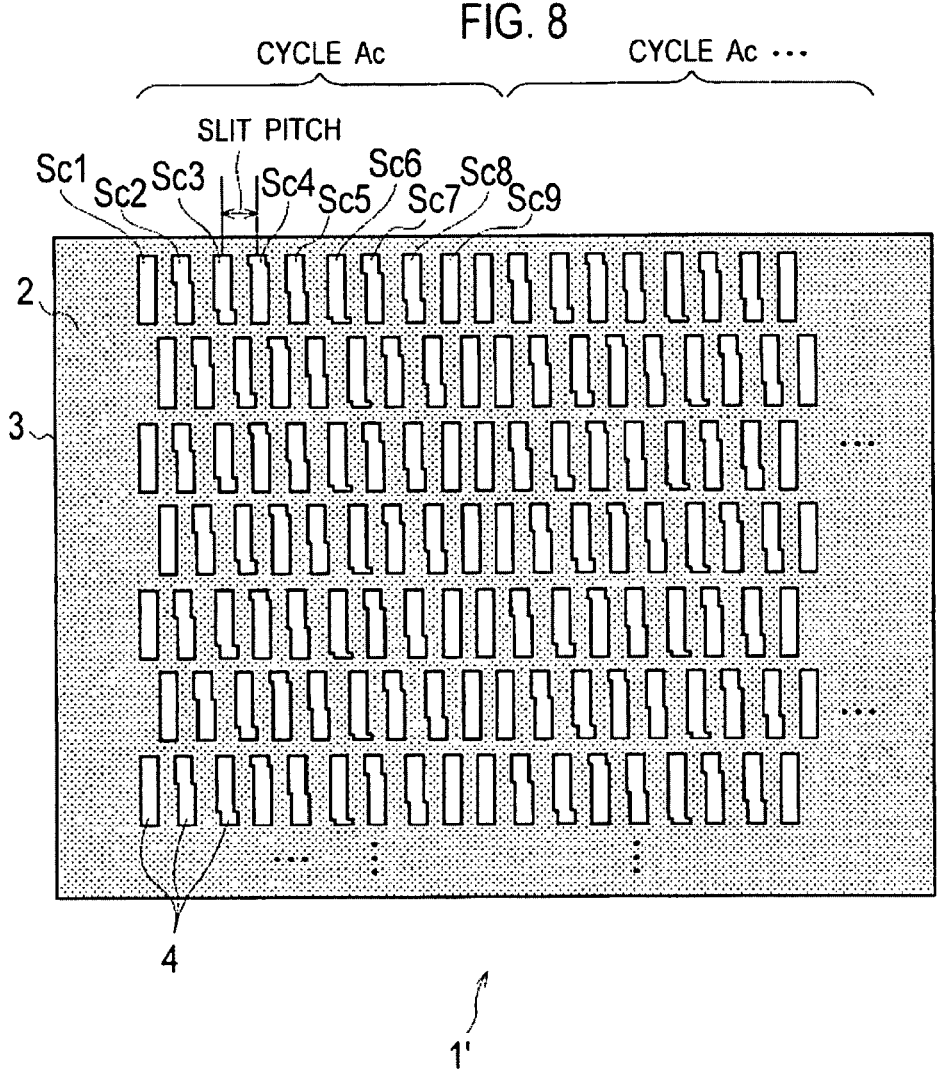
FIG. 8 is a diagram that shows a configuration of the parallax barrier according to an embodiment.

As shown in FIG. 8, parallax barrier 1' can also be configured by forming slit lines by repeatedly arranging cycle Ac in a horizontal direction and repeating the slit lines in order equal to equivalent of slit 1/2 to slip in a vertical direction.

Although different slit pitches that differ from ideal slit pitches exist in parallax barrier 1 and parallax barrier 1', the average value of pitches for each slit are approximately equal to ideal slit pitches. And, the gap regions for the ideal slits of each slit are dispersed. With such configuration, even if hue of the image, difference of chroma or brightness occurred by the cause of the gap, a viewer is not aware of that as uneven image.

Figure 2A:
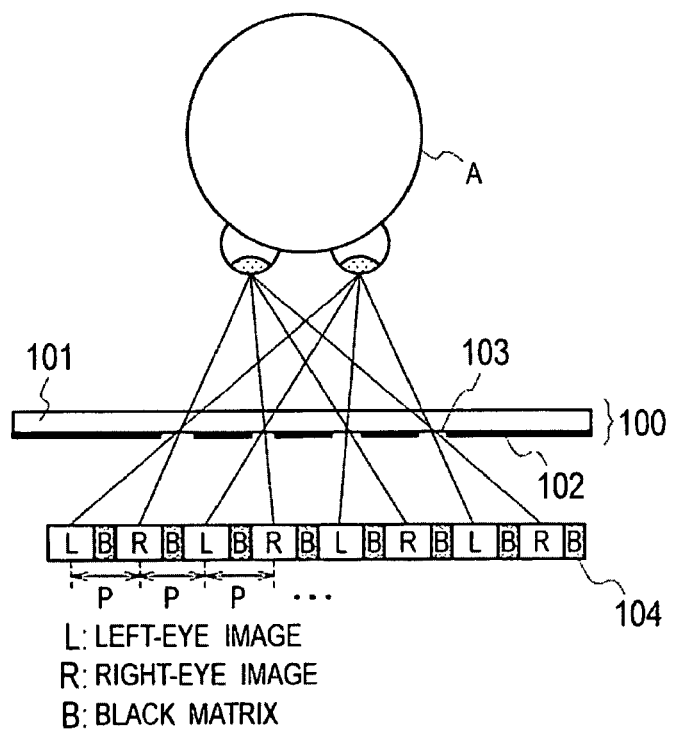
FIG. 2A and FIG. 2B are diagrams that show a configuration of a stereoscopic visual display device with a parallax barrier.
Figure 2B:
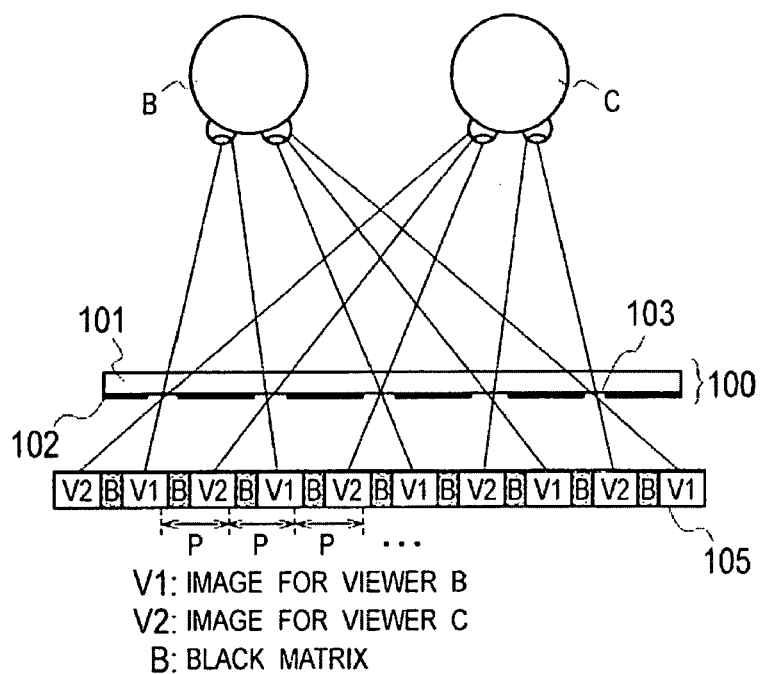
Figure 3A:
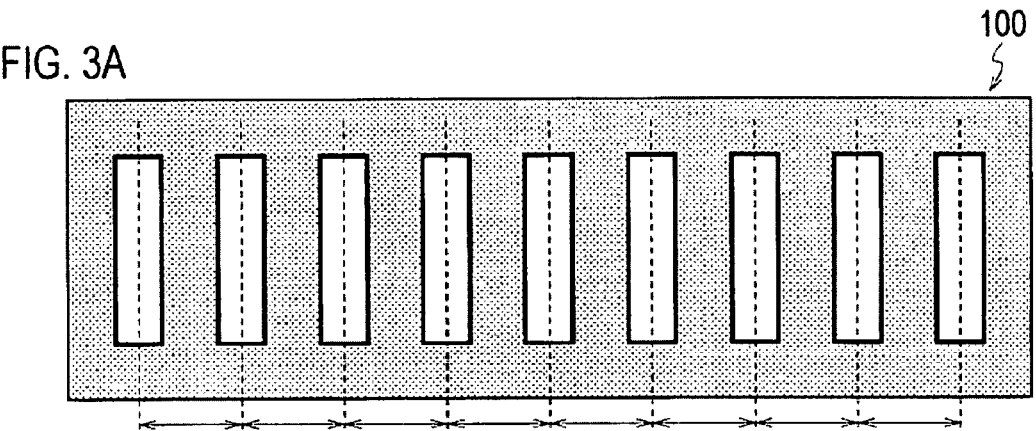
FIGS. 3A through FIG. 3C are diagrams that show a configuration of a multiple visual display device with a parallax barrier
Figure 3B:
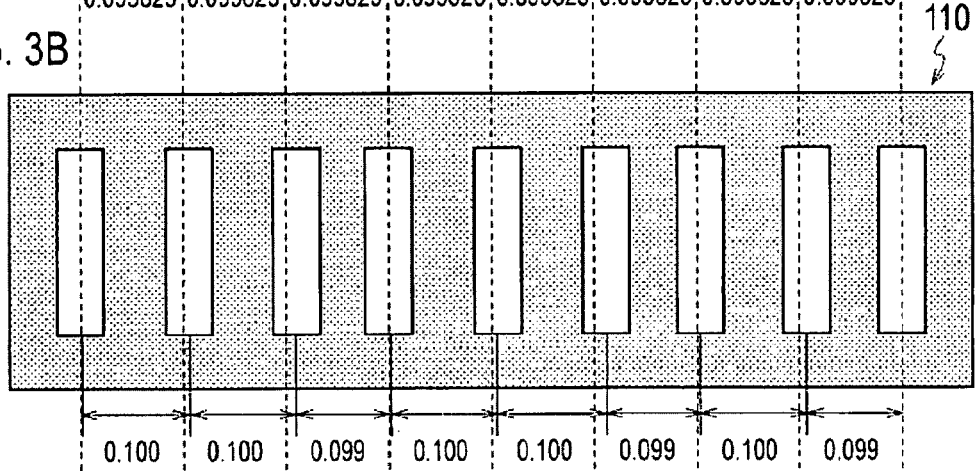
Figure 3C:
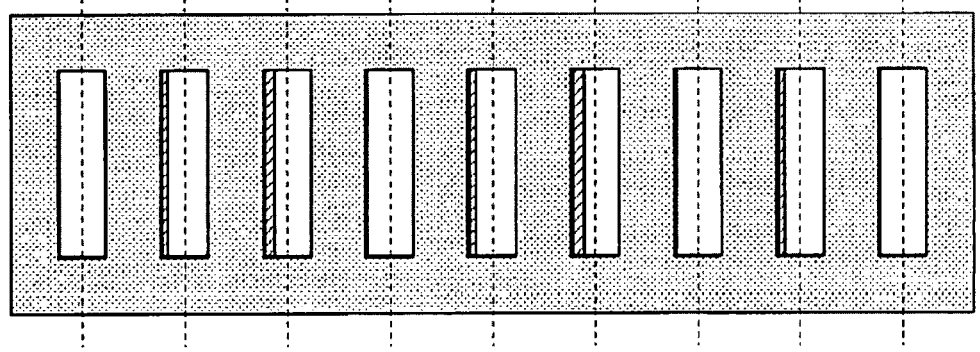

In a stereoscopic vision display device and a multiple vision display device of FIGS. 2A and 2B with the use of parallax barrier 1 of FIG. 4, viewer A can observe stereoscopic images without recognizing uneven images in FIG. 2A, and also, each viewers B and C can observe different images without recognizing uneven images in FIG. 2B.

Figure 9:
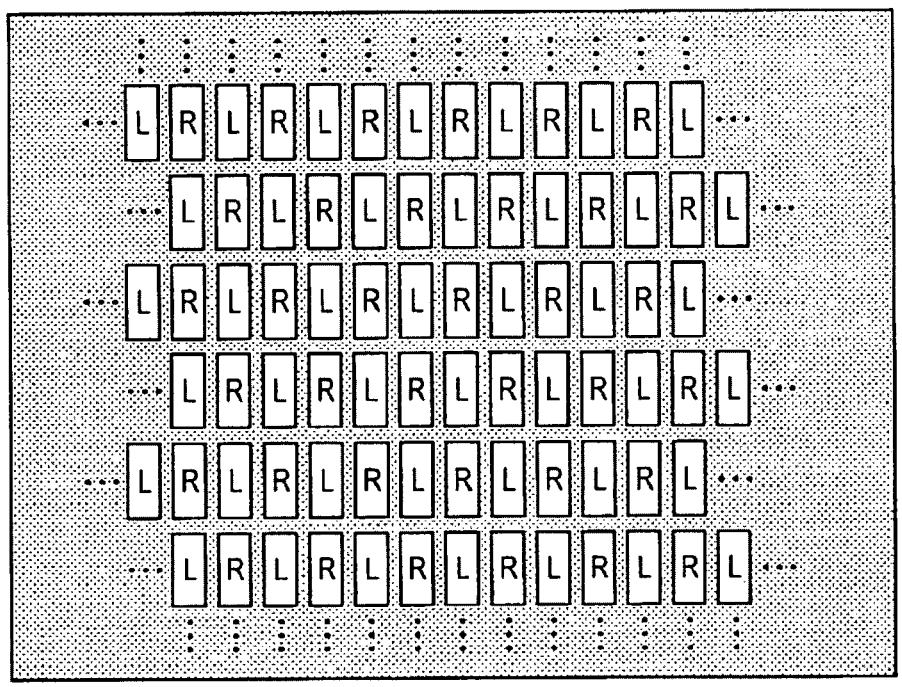
FIG. 9 is a diagram that shows an arrangement of images displayed on a visual display device when a stereoscopic visual display device is formed from other parallax barriers.

In a stereoscopic vision display device with the use of parallax barrier 1' of FIG. 8, left-eye image L and right-eye image R are displayed on liquid crystal display device 104 as shown in FIG. 9. The regions shown with hatching between left-eye image L and right-eye image R in FIG. 9 indicate black matrix regions. Furthermore, left-eye image L and right-eye image R are arranged with approximately accurate pixel pitch.

Figure 10:
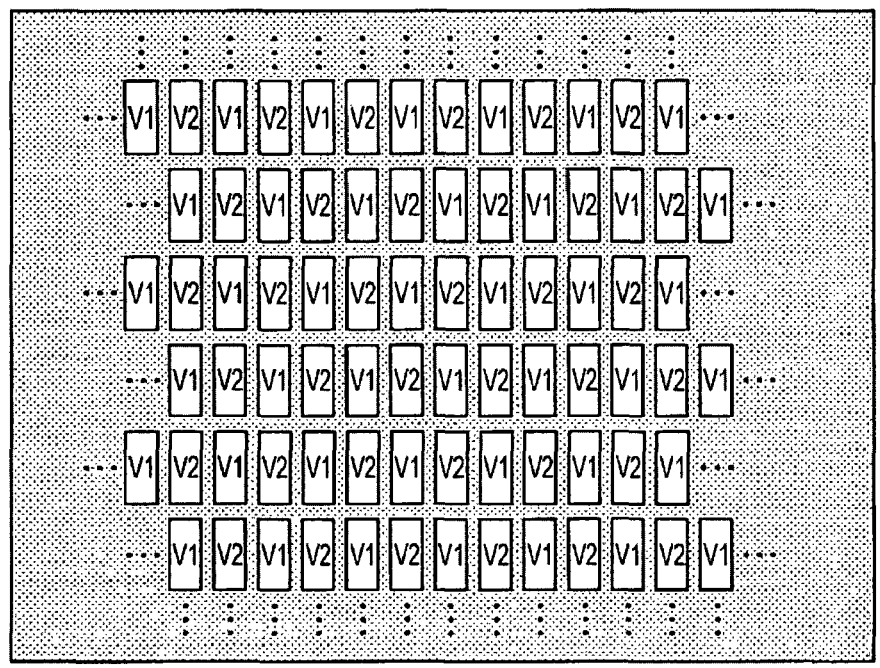
FIG. 10 is a diagram that shows an arrangement of images displayed on visual display device when multiple visual display devices are formed from other parallax barriers.

Also, in a multiple vision display device with the use of parallax barrier 1' of FIG. 8, an image for viewer B V1 and an image for viewer C V2 are displayed on liquid crystal display device 105 as shown in FIG. 10.

The invention provides an optical filter, a stereoscopic vision display device, and a multiple vision display device that use the optical filter. Even if slits having a mixture of multiple different slit pitches are arranged, viewers can observe stereoscopic images with the stereoscopic vision display device and also can Observe different images for each viewer with the multiple vision display device without noticing uneven images.

The invention may be embodied in other specific forms without departing from the spirit or essential characteristics thereof. The embodiments therefore are to be considered in all respects as illustrative and not restrictive; the scope of the invention being indicated by the appended claims rather than by the foregoing description, and all changes that come within the meaning and range of equivalency of the claims are therefore intended to be embraced therein.

For example, an optical filter of the invention can be replaced with a barrier for light source of a stereoscopic display device as described in Japanese Laid-Open Patent Publication No. 7-181429, a color filter barrier of a liquid crystal stereoscopic display device as described in Japanese Laid-Open Publication No. 8-194190, or a barrier of a stereoscopic display device as described in Japanese Laid-Open Publication No. 8-331605, the entire contents of each of which are incorporated herein by reference.

Figure 11:
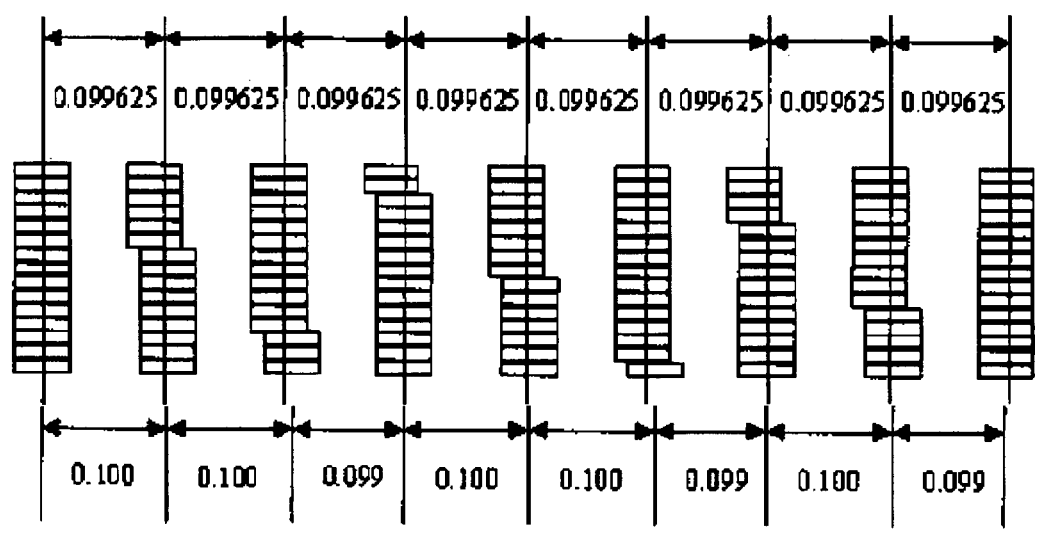
FIG. 11 is a diagram that shows an arrangement of light sources according to an embodiment.
Figure 12:
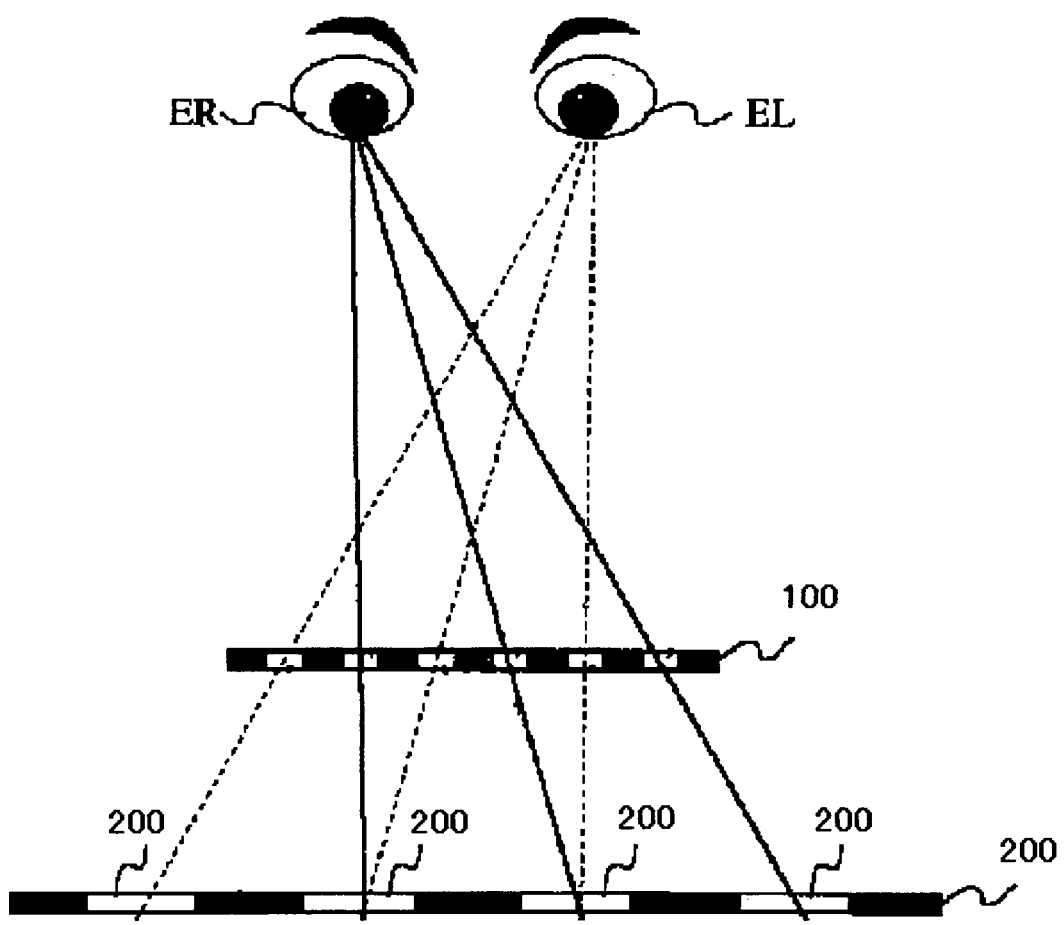
FIG. 12 is a diagram that shows a configuration of a stereoscopic visual display device according an embodiment.

A light source group may be used from a selective combination of multiple minute light sources (e.g., organic EL light). For example, light source unit 200 can provide effects as described herein by virtue of altered arrangement positions (as shown for example in FIG. 11) of the multiple minute light sources. FIG. 12 diagrammatically exemplifies a configuration of a stereoscopic visual display device that uses light source unit 200. A stereoscopic visual display device which a viewer can use without noticing uneven images can be made this way.

What is claimed is:

1. An illuminator comprising:
a plurality of fixed rod-like, vertically-extending light sources arranged in a fixed parallel relationship, each light source corresponding to a pair of displays including at least a first display of a first image, and a second display of a second image,
wherein the rod-like light sources form a light source row in which rod-like light sources adjacent to each other are arranged essentially at a same horizontal interval spacing and are parallel to each other,
wherein a light source pitch between a pair of adjacent rod-like light sources in the light source row toward longitudinal upper ends of the adjacent rod-like light sources differs from the pitch toward longitudinal lower ends and the light source pitch is a distance from a longitudinal center line of one of the rod-like light sources of the pair of rod-like adjacent light source pairs to a longitudinal center line of the other rod-like light source.

2. The illuminator as claimed in claim 1, wherein the rod-like light source row arrangement includes an average predetermined light source pitch.

3. The illuminator as claimed in claim 1, wherein the rod-like light source row forms a light source row orientation periodicity, and periodic light source pitch shifts differ by at least between their upper and lower positions.

4. The illuminator as claimed in claim 1, wherein the rod-like light sources are organic electroluminescent light.

5. A stereoscopic visual display, comprising:
an image display having regions arranged essentially in a common interval spacing, the image display regions include a first region displaying a first view image, and a second region displaying a second view image;
wherein the image display comprises:
a plurality of fixed rod-like, vertically-extending light sources arranged in a fixed parallel relationship, each light source corresponding to a pair of displays including at least a first display of a first image and a second display of a second image,
wherein the rod-like light sources form a light source row in which rod-like light sources adjacent to each other in a horizontal direction are arranged essentially at a same horizontal interval spacing and are parallel to each other,
wherein a light source pitch between a pair of adjacent rod-like light sources in the light source row toward longitudinal upper ends of the adjacent rod-like light sources differs from the pitch toward longitudinal lower ends and the light source pitch is a distance from a longitudinal center line of one of the rod-like light sources of the pair of rod-like adjacent light source pairs to a longitudinal centerline of the other light source,
wherein the first view image is observed at a first view position through an optical filter provided between the image display and a viewer, and the second view image is observed at a second view position through the optical filter.

6. The stereoscopic visual display of claim 5, wherein the rod-like light sources are organic electroluminescent light.

7. The stereoscopic visual display of claim 5, wherein the optical filter is a barrier.

8. The stereoscopic visual display of claim 7, wherein the barrier is positioned in front of the image display.

* * * * *